Feb. 14, 1967 J. ELICH ETAL 3,304,367

REGENERATIVE REPEATER

Filed Aug. 16, 1963 3 Sheets-Sheet 1

LEGEND:
△ = Gate
FF = Flip-Flop
A.N.= Attenuation Network
A.R.= Automatic Reset

INVENTORS
JOHN ELICH
FRANK J. MASCIANDARO
BY J. B. Burke
ATTORNEY

Feb. 14, 1967 J. ELICH ETAL 3,304,367

REGENERATIVE REPEATER

Filed Aug. 16, 1963 3 Sheets-Sheet 2

INVENTORS
JOHN ELICH
FRANK J. MASCIANDARO

BY J. B. Burke

ATTORNEY

REGENERATIVE REPEATER

Filed Aug. 16, 1963 3 Sheets-Sheet 3

INVENTORS
JOHN ELICH
FRANK J. MASCIANDARO
BY J. B. Burke
ATTORNEY

United States Patent Office 3,304,367

Patented Feb. 14, 1967

3,304,367

REGENERATIVE REPEATER

John Elich, Staten Island, and Frank J. Masciandaro, Brooklyn, N.Y., assignors to The Western Union Telegraph Company, New York, N.Y., a corporation of New York Filed Aug. 16, 1963, Ser. No. 302,520
14 Claims. (Cl. 178—70)

This invention concerns a regenerative repeater for telegraph usage.

One object of the invention is to provide a transistorized regenerative repeater which is smaller in size and less expensive in construction than prior regenerative repeaters.

Another object is to provide a regenerative repeater capable of operating at high speeds in a wide range of unit codes.

A further object is to provide a transistorized regenerative repeater having greater ease of servicing, greater reliability in operation, and operability at high speeds and over a wide range of unit codes.

According to the invention, the regenerative repeater includes the following features:

(1) An oscillator set for the baud rate of the transmission to be regenerated, which may be as high as 600 bauds.

(2) Means for controlling the number of regenerated cycles per character to accommodate the particular unit code transmission.

(3) Use of a free-running oscillator, as opposed to a conventional start-stop type synchronized by a start pulse.

(4) Provision of a frequency divider in association with the free-running oscillator in order to accommodate signals having a high degree of distortion.

(5) Employment of gates to blind and unblind the free running oscillator from the regenerative element, thereby providing synchronism with the input.

(6) A counting chain acting in conjunction with input polarity to reblind an oscillator gate.

(7) Provision of three bistable elements in the counting chain and employment of binary and shift register techniques for registering a count.

(8) An automatic reset element which, in the event of a power failure, insures that each essential, affected part of the repeater attains a predetermined condition once power is restored.

(9) Input reading means including a multivibrator which serves as an electronic filter to suppress splits (voltage changes) on the line and to prevent further biasing of the input signal.

The invention will be best understood from the following detailed description taken together with the drawings, wherein.

Figure 1:
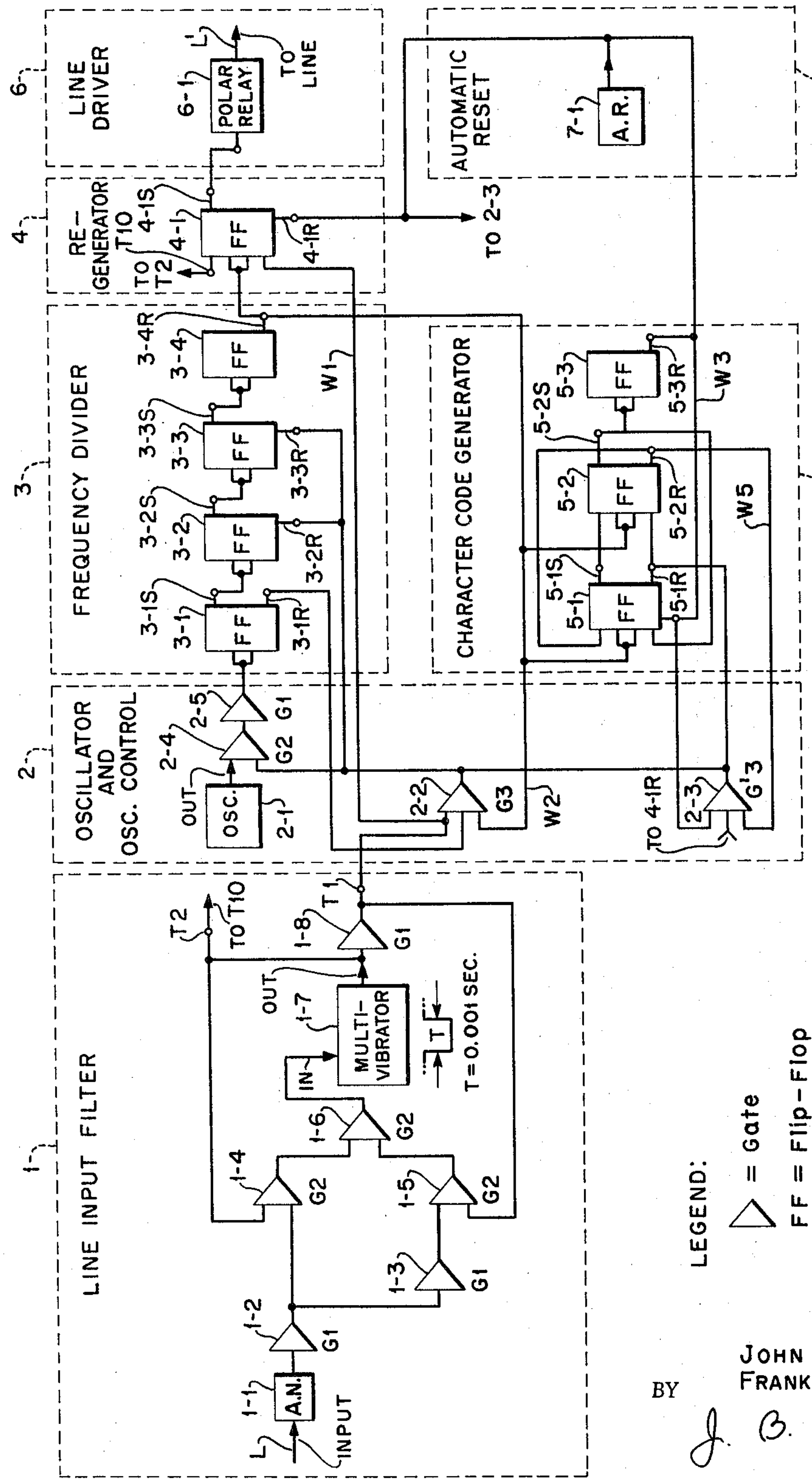
FIG. 1 is a block diagram of a regenerative repeater embodying the invention.
Figure 6:
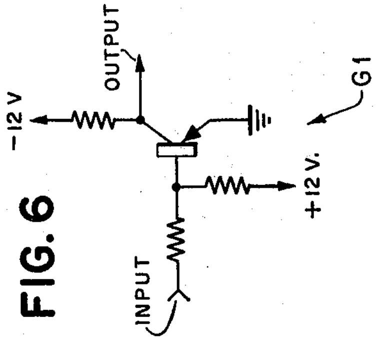

Referring first to FIG. 1, the regenerative repeater RR includes a line input filter 1 in which input line L is connected to an attenuator network (A.N.) 1–1 for driving a first gate 1–2. The attenuator network is shown in detail in FIG. 2. Gate 1–2 is a single input gate of type G1 shown in detail in FIG. 6.

Figure 7:
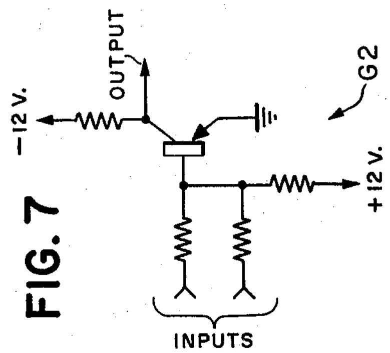

The output of gate 1–2 is connected to the input of gate 1–3 which is also a type G1 gate, and to a double input gate 1–4 of type G2 shown in detail in FIG. 7. The output of gate 1–3 is connected to double input gate 105 of type G2. The output of gate 1–4 is connected to gate 1–6 which is a double input gate of type G2. Gate 1–5 has an output connected to gate 1–6.

Figure 3:
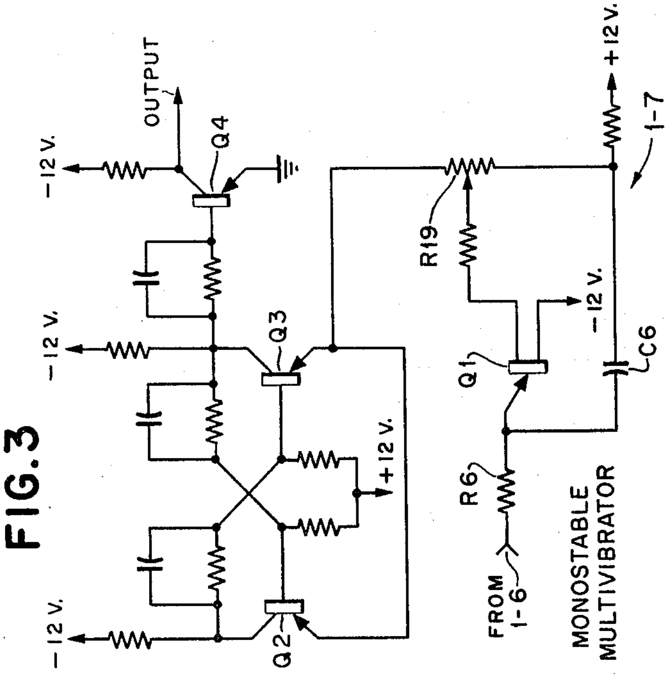
FIG. 3 is a circuit diagram of a monostable multivibrator.
Figure 8:
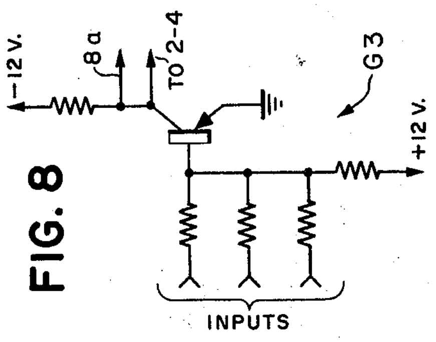

The output of gate 1–6 is connected to a multivibrator 1–7 shown in detail in FIG. 3. The output of the multivibrator is connected to an input of gate 1–4, to the input terminal T10 of flip-flop 4–1, and to the input of gate 1–8 which is a single input gate of type G1. The output of gate 1–8 is connected to an input of gate 1–5 and to an input of triple input gate 2–2. Gate 2–2 is a gate of type G3 shown in detail in FIG. 8. Gate 2–2 is located in the oscillator and oscillator control block 2 of the repeater.

Figure 9:
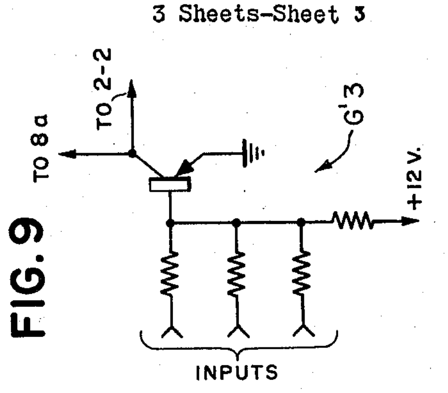
FIGS. 6 to 9 are diagrams of gate circuits.

The oscillator 2–1 is a conventional transistorized single frequency generator located in block 2. The output of this oscillator is connected to a double input gate 2–4. Gate 2–4 is a type G2 gate. It has another input connected to the outputs of gates 2–2 and 2–3 in block 2. Gate 2–3 is a triple input gate of type G′3 shown in detail in FIG. 9.

The repeater has a frequency divider block 3 including four flip-flop (FF) circuits 3–1, 3–2, 3–3, 3–4. The flip-flop circuits are of the type shown in FIG. 5. The flip-flops of block 3 have double ended inputs. The output of gate 2–5 is connected to the input of flip-flop 3–1. The other flip-flops are arranged as a counting chain without output 3–1S of flip-flop 3–1 connected to the input of flip-flop 3–2. The output 3–2S of flip-flop 3–2 is connected to the input of flip-flop 3–3. The output 3–3S of flip-flop 3–3 is connected to the input of flip-flop 3–4. The output 3–4R of flip-flop 3–4 is connected to one input of gate 2–2 and to the input of flip-flop 4–1 in regenerator block 4. One input of gate 2–2 is connected to an input of flip-flop 4–1 via wire W1. The output 4–1S of flip-flop 4–1 is connected to a polar relay 6–1 in the line drive block 6. The output line L′ is connected to the output of relay 6–1.

In character code generator block 5 are three flip-flops 5–1, 5–2 and 5–3. One input of gate 2–2 is connected via wire W2 to the inputs of flip-flops 5–1, 5–2, and 4–1. The input of flip-flop 5–3 is connected to output 5–2S of flip-flop 5–2 and to the output of gate 2–3. Output 5–1S of flip-flop 5–1 is connected to a terminal of flip-flop 5–2. The output 5–2S of flip-flop 5–2 is connected to the input of flip-flop 5–3. Terminal 5–3R of flip-flop 5–3 is connected to the output of the automatic reset circuit 7–1. One terminal of flip-flop 5–1 and a terminal of gate 2–3 are connected to the reset circuit 7–1 via wire W3.

Terminal 5–2R of flip-flop 5–2 is connected to a terminal of flip-flop 5–1 via wire W4 and to an input of gate 2–3 via wire W5.

In operation of the repeater line input filter 1 prevents the repeater from recognizing any losses or changes of potential on the incoming mark and space signal pulses with a duration of a predetermined small fraction of the duration of a signal pulse and also inverts the signals for performing logic functions.

The oscillator and oscillator control 2 supply and control the probe pulses necessary for the timing of the input signal.

Frequency divider 3 permits oscillator 2–1 to run at a high frequency, thus increasing the percent of bias and distortion the repeater can handle.

Regenerator flip-flop 4–1 employs timing information derived from an integration of the input signal pulses and the probe pulses that originate from the oscillator 2–1.

Character code generator 5 controls the probe pulse.

Automatic reset circuit 7–1 insures that, in case of power failure, a reset condition is established throughout the logic circuits when power is restored.

Line input filter 1 includes attenuation network 1–1 and a one millisecond multivibrator 1–7. Network 1–1 prevents damage to the low voltage level transistor circuitry of the repeater from any high voltage level input signals.

The filter 1 utilizes multivibrator 1–7, shown in FIG. 3 to eliminate any splits (losses or changes of potential) on the incoming pulses with a duration of less than one millisecond. In effect, incoming signals of less than one millisecond will not be reproduced at the output of the multivibrator 1–7. Thus, provided the output of NOR gate 1–4 or 1–5 is at negative potential for at least one millisecond, driving gate 1–6 to ground, the multivibrator 1–7 will change state. At this point, the output of multivibrator 1–7 is fed back to the input of gate 1–4, returning gate 1–6 to negative potential and maintaining the multivibrator in its particular state. The filtered signal consequently follows the incoming signal with a delay of one millisecond.

One important feature of the filter circuit 1 is that the time constant used for both the positive and negative changes of the input signal is physically one and the same. This eliminates the possibility of any additional bias due to component variation. The multivibrator can be adjusted to any desired amount of time duration.

NOR gate 1–8 inverts the filtered input signal for performing necessary logic functions.

The frequency divider 3 includes a binary counter employing flip-flops 3–1 through 3–4. The input to this counter is a square wave derived from the free-running oscillator 2–1. Th output WV2 if the counter is used to deliver "controlled" probe pulses to the regenerator flip-flop 4–1; see FIG. 10. At the end of each character, all four flip-flops 3–1 to 3–4 are returned to their reset or idle condition. Terminals 3–2R and 3–3R of flip-flops 3–2, 3–3 receive a reset pulse from gate 2–2 or 2–3.

Figure 10:
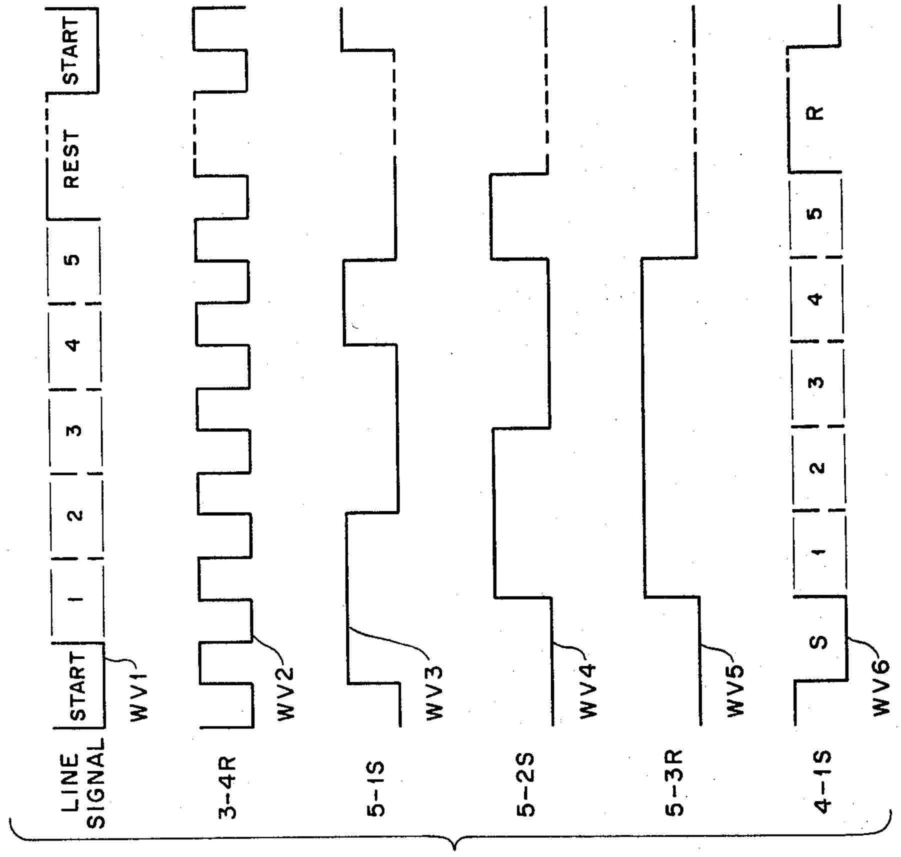
FIG. 10 is a graphite diagram of waveforms, used in explaining the invention.

The regenerator flip-flop 4–1, which is triggered by the probe pulses WV2 from flip-flop 3–4 derives its timing information from the input signal WV1 and the probe pulses that originate from the oscillator 2–1; see FIG. 10. The probe pulses provide the triggering while the input signal provides the pedestals. This sampling process occurs in the middle of every bit.

During the idle condition, flip-flop 4–1 is reset, that is, terminal 4–1R is at ground potential. During the operating cycle, the regenerated output signal WV6 follows the (filtered) input signal WV1 by one-half bit.

The character code generator 5 is a semi-shift-register, semi-binary counter whose function is to control the number of probe pulses originating from the oscillator 2–1.

The input to the character code generator 5 is the identical probe pulse WV2 that triggers the regenerator flip-flop 4–1. During idle condition, flip-flops 5–1 through 5–4 are reset. An initial count, however, resulting in a change of state of flip-flop 5–1 does not necessarily indicate regeneration, as will be explained.

Oscillator 2–1 is a free running standard oscillator, designed to operate at fixed rate.

Gates 2–2 and 2–3 are control gates which, when led into gate 2–4, blind or unblind the oscillator output. The main function of gate 2–5 is to increase the maximum bias and distortion capabilities of the system, for it is this logic function which permits the second half of the bias and equation Eg. No. 1 to halved.

During the idle condition, all inputs to gates 2–2 and 2–3 are at ground, blinding gate 2–4 and, consequently, the output of the oscillator 2–1. Upon the arrival of a start pulse, gate 2—2 goes negative, permitting the frequency divider 3 to be triggered by the oscillator pulses. If the incoming start pulse is present for at least one half bit, flip-flop 4–1 will also cause the character code generator 5 to start counting. At this point the negative output at terminal 4–1R maintains gate 2—2 at ground. During the remainder of the character, outputs from the character code generator 5 keeps 2—2 at ground. When the reset pulse has been received and the character code generator counter has expired, i.e., flip-flops 5–2 through 5–4 are reset, gates 2—2 and 2–3 return to negative potential, driving gate 2–4 to ground and blinding the oscillator 2–1. The negative pulse is also used to reset flip-flops 3–2, 3–3 and 5–1.

If the start pulse was not originally present for one half bit—that is, when the pulse at terminal 3–4R initially triggered flip-flop 4–1—gates 2—2 and 2–3 would return to negative potential, resetting the unit. This condition prevents noise pulses from changing the status of the output of the repeater during an idle condition.

The output WV6 of regenerator flip-flop 4–1 is fed directly to the polar relay and line L′.

In case of power failure, an automatic reset circuit 7–1, shown in automatic reset block 7, is provided to return the logic circuits to a reset or idle condition when power is restored. This also insures that a continuous marking input will produce a continuous marking output and a continuous spacing input will produce a continuous spacing output. Circuit 7–1 is shown in detail in FIG. 5.

The multivibrator 1–7 shown in FIG. 3, is a portion of filter 1, which contains in addition an input control transistor and an output transistor that is base controlled by the multivibrator. The input to multivibrator 1–7 is derived from a control gate 1–6 which in turn has a dual input of two gates 1–4 and 1–5. A change in polarity on the line input L will drive one of gates 1–4 or 1–5 to negative which in turn will drive gate 1–6 to positive. The positive input into multivibrator 1–7 will bias the control transistor to a conducting condition after a charging delay of one millisecond. Once the control transistor fires, the multivibrator will change state thereby reversing the conducting condition of the output transistor. To prevent the multivibrator from retiming then reverting to its initial state, the output of multivibrator 1–7 is fed back, or inverted and fed back, to either gate 1–4 or 1–5 thus returning gate 1–6 to its negative state and cutting off the control transistor. The output of multivibrator 1–7 functions to determine the condition of the regenerator element and, in turn, the polarity of the signal sent to the line.

The electronic input filter 1 therefore suppresses line hits, appearing as brief interruptions of line current line that could otherwise produce a false signal start, reads and determines polarity of the line output and, by utilizing a common time constant circuit (R6, C6) in multivibrator 1–7, avoids introduction of bias to the marking and spacing signals.

It will be noted in FIG. 3, that multivibrator 1–7 has an input transistor Q1. An RC timing circuit including resistor R6 and capacitor C6 is connected to the transistor. The gate 1–6 is connected to resistor R6. The output is taken from transistor Q4 connected in circuit with transistors Q2, Q3.

A normal idle condition may be assumed, in which transistors Q1, Q2, Q4 are off and non-conducting while transistor Q3 is on and conducting, with a negative idle line input. A positive pulse arriving from gate 1–6 upon the arrival of a start pulse will trigger transistor Q1 on if the pulse continues for the period of the timing circuit R6, C6. When transistor Q1 conducts, its base potential will drive the emitters of transistors Q2, Q3 to negative thus rendering transistor Q3 non-conducting. With transistor Q3 off, the sudden rise in potential at the base of transistor Q2 will cause transistor Q2 to conduct. The turning off of transistor Q3 will also provide a base potential to transistor Q3 so that transistor Q4 will conduct and the output will change from 1 to 0. The output from transistor Q4 is fed back to return gate 1–6 to negative thus preventing the timing circuit R6, C6 from recharging.

Figure 2:
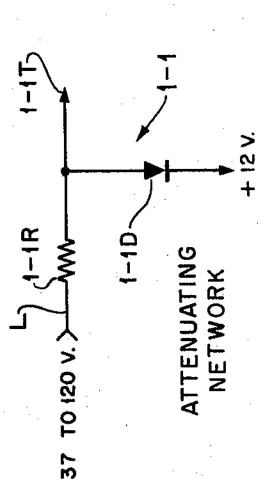
FIG. 2 is a circuit diagram of an attenuator network.

The attenuating network 1–1 of FIG. 2 has a resistor 1–1R to which line L is connected. Positive clamping potential battery is connected to the output terminal 1–1T via diode rectifier 1–1D to protect the logic circuitry.

All of the multiple input gates G2, G3 and G3′ of FIGS.

7–9 are negative OR gates, that is, if all inputs of a gate are 0, then the output is 1, but if any input is 1, then the gate will have an 0 output. In gates G3 and G′3, ground potential is 0 and 1 is −12 volts. In gate G′3 of FIG. 9, negative bias may be obtained from terminal 8*a* of gate G3 which is connected via resistor 8R to negative 12 volts; see FIG. 8. Single input gate G1 actually serves as an invertor for the input signal.

Figure 5:
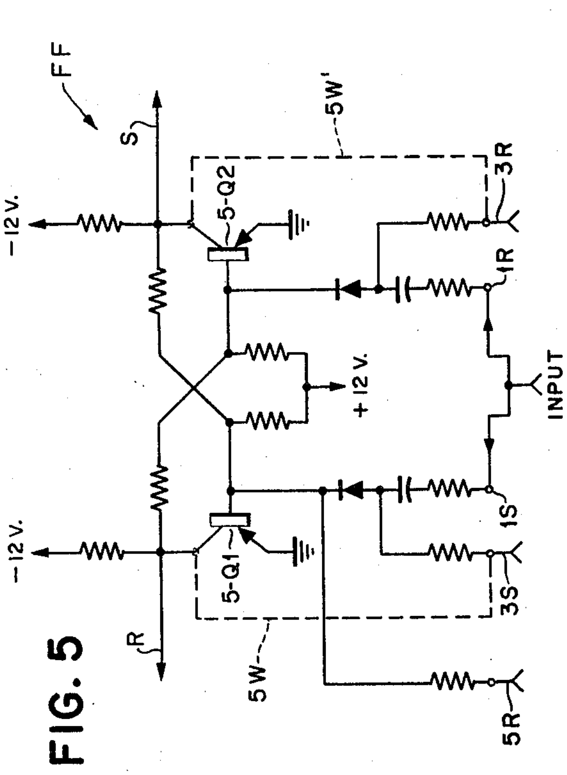
FIG. 5 is a diagram of a flip-flop circuit.

In FIG. 5 is shown a generalized circuit for the several flip-flops of the system. Terminal 5R is employed only on flip-flops 4–1 and 5–3 for connection thereto of the reset circuit 7–1. Terminals 3S and 3R are used as pedestal inputs only for flip-flops 4–1, 5–1 and 5–2. All other flip-flops have terminal 3S connected via wire 5W to terminal R and terminal 3R connected to terminal S via wire 5W′.

The flip-flop circuit can exist in one of two states, either SET or RESET. The RESET condition exists when transistor 5Q1 is conducting and transistor 5Q2 is off or nonconducting, thereby producing 0 at output R and 1 at output S. A SET condition is the reverse of this with 0 at output S and L at output R.

A positive trigger pulse applied to the joint inputs 1S, 1R will cause the flip-flop circuit to SET provided terminal 3S is at ground potential. A positive trigger pulse to joint inputs 1S, 1R will cause the flip-flop to RESET if terminal 3R is at ground potential.

The ground to terminals 3S and 3R is provided by the outputs R and S respectively except for flip-flops 4–1, 5–1 and 5–2 where separate pedestal inputs are provided.

Terminal 5R is employed only on flip-flops 4–1 and 5–3 and functions to apply reset potential from reset circuit 7–1 after a temporary power failure or when power is turned on. A negative pulse from the reset circuit to terminal 5R will turn transistor 5Q1 on and thereby reset the flip-flop circuit.

Figure 4:
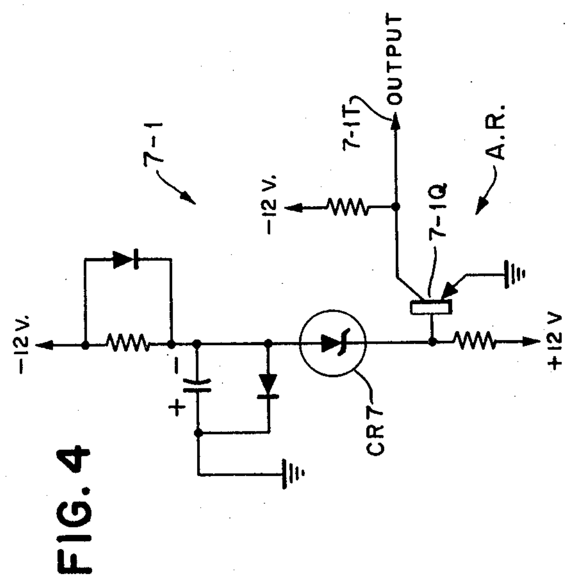
FIG. 4 is a diagram of an automatic reset circuit.

The automatic reset (A.R.) circuit 7–1 of FIG. 4 includes a zener diode CR7 connected to the base of a transistor 7–1Q. The output of the circuit is taken from the collector of this transistor.

The reset circuit 7–1 functions to reset all connected flip-flops when the power of the system first applied or after a temporary interruption of power. The flip-flops to be reset have their terminals 5R connected to output terminal 7–1T. Under normal conditions the output of the reset circuit is at ground potential or 0, and will not affect individual operations of the flip-flops 4–1 and 5–3. When power is first applied, however, transistor 7–1Q will remain off, while the base circuit charges through the zener diode CR7 and during this interval a negative reset potential is provided to effect resetting of flip-flops 4–1, 5–3.

In FIG. 10, waveforms are shown at various points in the system. The applied line signal WV1 is shown as a series of positive pulses after the initial start pulse. The timing signal WV2 obtained from the output 3–4R of flip-flop 3–4 and is applied to the regenerator flip-flop 4–1. Waveforms WV3, WV4 and WV5 are obtained at the outputs 5–1S, 5–2S, 5–3R of flip-flops 5–1, 5–2, 5–3 respectively. The resultant line signal WV6 which duplicates the input line signal WV1 is obtained at output 4–1S of the regenerator flip-flop and is applied to the line driver polar relay 6–1 for transmission over line L′; see FIG. 1.

It will be noted that the system is entirely transistorized. It employs a continuously running oscillator to produce a timing signal which in coincidence with the character code applied to flip-flop 4–1 reproduces the signals arriving on line L.

What is claimed and sought to be protected by Letters Patent is:

1. A regenerative repeater for telegraph signals, comprising in combination:

(a) a line input filter for receiving mark and space input signals from an input line and for suppressing any input signals and signal variations having a duration of less than a predetermined minimum time;

(b) a free running oscillator for producing continuously square probe pulses at a predetermined rate;

(c) a frequency divider for producing other square proble pulses at a predetermined reduced frequency from the first named probe pulses;

(d) oscillator control means connected between the oscillator and frequency divider for cutting off from the frequency divider and for restoring to the frequency divider the square probe pulses produced by the oscillator;

(e) A signal regenerator circuit connected to the frequency divider to receive therefrom said other probe pulses and connected to the line input filter to receive input signals therefrom;

(f) means in the signal regenerator for integrating said input pulses and said other probe pulses to produce timing pulses; and (g) other means in the signal regenerator for producing output signals duplicating the input signals applied to the line input filter with momentary signal interruptions and signal variations suppressed, said output signals being produced at a rate determined by said timing pulses.

2. A regenerative repeater for telegraph signals, comprising in combination:

(a) a line input filter for receiving mark and space input signals from an input line and for suppressing any input signals and signal variations having a duration of less than a predetermined minimum time;

(b) A free running oscillator for producing continuously square probe pulses at a predetermined rate;

(c) a frequency divider for producing other square probe pulses at a predetermined reduced frequency from the first named probe pulses;

(d) oscillator control means connected between the oscillator and frequency divider for cutting off from the frequency divider and for restoring to the frequency divider the square probe pulses produced by the oscillator;

(e) a signal regenerator circuit connected to the frequency divider to receive therefrom said other probe pulses and connected to the line input filter to receive input signals therefrom;

(f) means in the signal regenerator for integrating said input pulses and said other probe pulses to produce timing pulses;

(g) other means in the signal regenerator for producing output signals duplicating the input signals applied to the line input filter with momentary signal interruptions and signal variations suppressed, said output signals being produced at a rate determined by said timing pulses.

(h) a character code generator connected to the signal regenerator for controlling in a predetermined unit code the number of said other probe pulses passing to the signal regenerator from the oscillator control means; and (i) polarized line drive means connected to the signal regenerator for receiving therefrom said output signals and for applying said output signals with controlled polarity to an output line.

3. A regenerative repeater for telegraph signals, comprising in combination:

(a) a line input filter for receiving mark and space input signals from an input line and for suppressing any input signals and signal variations having a duration of less than a predetermined minimum time;

(b) a free running oscillator for producing continuously square probe pulses at a predetermined rate;

(c) a frequency divider for producing other square probe pulses at a predetermined reduced frequency from the first named probe pulses;

(d) oscillator control means connected between the oscillator and frequency divider for cutting off from the frequency divider and for restoring to the frequency divider the square probe pulses produced by the oscillator;

(e) a signal regenerative circuit connected to the frequency divider to receive therefrom said other probe pulses and connected to the line input filter to receive input signals therefrom;

(f) means in the signal regenerator for integrating said input pulses and said other probe pulses to produce timing pulses;

(g) other means in the signal regenerator for producing output signals duplicating the input signals applied to the line input filter with momentary signal interruptions and signal variations suppressed, said output signals being produced at a rate determined by said timing pulses;

(h) said signal regenerator including a flip-flop circuit;

(i) a power supply connected to said flip-flop circuit for energizing the same; and (j) automatic reset means connected to said flip-flop circuit for restoring the same to a set condition upon restoration of power in the event said power supply is cut off from the flip-flop circuit, whereby a continuous marking input signal will result in a continuous marking output signal and a continuous spacing input signal will result in a continuous spacing output signal.

4. A regenerative repeater for telegraph signals, comprising in combination:

(a) a line input filter for receiving mark and space input signals from an input line and for suppressing any input signals and signal variations having a duration of less than a predetermined minimum time;

(b) a free running oscillator for producing continuously square probe pulses at a predetermined rate;

(c) a frequency divider for producing other square probe pulses at a predetermined reduced frequency from the first named probe pulses;

(d) oscillator control means connected between the oscillator and frequency divider for cutting off from the frequency divider and for restoring to the frequency divider the square probe pulses produced by the oscillator;

(e) a signal regenerator circuit connected to the frequency divider to receive therefrom said other pulses and connected to the line input filter to receive input signals therefrom;

(f) means in the signals regenerator for integrating said input pulses and said other probe pulses to produce timing pulses;

(g) other means in the signal regenerator for producing output signals duplicating the input signals applied to the line input filter with momentary signal interruptions and signal variations suppressed, said output signals being produced at a rate determined by said timing pulses;

(h) a character code generator connected to the signal regenerator for controlling in a predetermined unit code the number of said other probe pulses passing to the signal regenerator from the oscillator control means;

(j) said signal regenerator including a single flip-flop circuit, and said character code generator including a series of flip-flop circuits arranged as a semi-shift register and semi-binary counter;

(j) a power supply connected to the flip-flop circuits of the character code generator and signal regenerator; and (k) automatic reset means connected to the flip-flop circuits of the character code generator and signal regenerator for restoring the same to a set condition upon restoration of power in the event said power supply is cut off from the flip-flop circuits of the character code generator and signal regenerator, whereby a continuous marking input signal will result in a continuous marking output signal and a continuous spacing input signal will result in a continuous spacing output signal.

5. A regenerative repeater for telegraph signals, comprising in combination:

(a) a line input filter for receiving mark and space input signals from an input line and for suppressing any input signals and signal variations having a duration of less than a predetermined minimum time;

(b) a free running oscillator for producing continuously square probe pulses at a predetermined rate;

(c) a frequency divider for producing other square probe pulses at a predetermined reduced frequency from the first named probe pulses;

(d) oscillator control means connected between the oscillator and frequency divider for cutting off from the frequency divider and for restoring to the frequency divider the square probe pulses produced by the oscillator;

(e) a signal regenerative circuit connected to the frequency divider to receive therefrom said other probe pulses and connected to the line input filter to receive input signals therefrom;

(f) means in the signal regenerator for integrating said input pulses and said other probe pulses to produce timing pulses;

(g) other means in the signal regenerator for producing output signals duplicating the input signals applied to the line input filter with momentary signal interruptions and signal variations suppressed, said output signals being produced at a rate determined by said timing pulses;

(h) said signal regenerator including a flip-flop circuit;

(i) a power supply connected to said flip-flop circuit for energizing the same;

(j) automatic reset means connected to said flip-flop circuit for restoring the same to a set condition upon restoration of power in the event said power supply is cut off from the flip-flop circuit, whereby a continuous marking input signal will result in a continuous marking output signal and a continuous spacing input signal will result in a continuous spacing output signal; and (k) polarized line driver means connected to the signal regenerator for receiving therefrom output signals and for applying said output signals with controlled polarity to an output line.

6. A regenerative repeater for telegraph signals, comprising in combination:

(a) a line input filter for receiving mark and space input signals from an input line and for suppressing any input signals and signal variations having a duration of less than a predetermined minimum time;

(b) a free running oscillator for producing continuously square probe pulses at a predetermined rate;

(c) a frequency divider for producing other square probe pulses at a predetermined reduced frequency from the first named probe pulses;

(d) oscillator control means connected between the oscillator and frequency divider for cutting off from the frequency divider and for restoring to the frequency divider the square probe pulses produced by the oscillator;

(e) a signal regenerator circuit connected to the frequency divider to receive therefrom said other pulses and connected to the line input filter to receive input signals therefrom;

(f) means in the signals regenerator for integrating said input pulses and said other probe pulses to produce timing pulses;

(g) other means in the signal regenerator for producing output signals duplicating the input signals applied to the line input filter with momentary signal interruptions and signal variations suppressed, said output signals being produced at a rate determined by said timing pulses;

(h) a character code generator connected to the signal regenerator for controlling in a predetermined unit code the number of said other probe pulses passing to the signal regenerator from the oscillator control means;

(i) said signal regenerator including a single flip-flop circuit, and said character code generator including a series of flip-flop circuits arranged as a semi-shift register and semi-binary counter;

(j) a power supply connected to the flip-flop circuits of the character code generator and signal regenerator;

(k) automatic reset means connected to the flip-flop circuits of the character code generator and signal regenerator for restoring the same to a set condition upon restoration of power in the event said power supply is cut off from the flip-flop circuits of the character code generator and signal regenerator, whereby a continuous marking input signal will result in a continuous marking output signal and a continuous spacing input signal will result in a continuous spacing output signal; and (l) polarized line driver means connected to the signal regenerator for receiving therefrom output signals and for applying said output signals with controlled polarity to an output line.

7. A regenerative repeater for telegraph signals, comprising in combination:

(a) a line input filter for receiving mark and space input signals from an input line and for suppressing any input signals and signal variations having a duration of less than a predetermined minimum time;

(b) said line input filter comprising:

(1) an attenuation network to limit the amplitude of input signals;

(2) a monostable multivibrator; and (3) a plurality of gates connected in circuit with said attenuation network and said multivibrator, whereby input filter has filtered output which follows the input signal with a delay of at least said predetermined minimum time;

(c) a free running oscillator for producing continuously square probe pulses at a predetermined rate;

(d) a frequency divider for producing other square probe pulses at a predetermined reduced frequency from the first named probe pulses, said frequency divider comprising a binary counter including a first series of flip-flop circuits;

(e) oscillator control means including a plurality of gate circuits connected between the oscillator and frequency divider for cutting off from the frequency divider and for restoring to the frequency divider the square probe pulses produced by the oscillator;

(f) a signal regenerator including a single other flip-flop circuit connected to the frequency divider to receive therefrom said other probe pulses and connected to the line input filter for receiving delayed, filtered input signals therefrom; and (g) said signal regenerator including a single other flip-flop circuit for integrating said filtered input pulses and said other probe pulses to produce timing pulses and for producing output signals duplicating the filtered input signals, said output signals being produced at a rate determined by said timing pulses.

8. A regenerative repeater for telegraph signals, comprising in combination:

(a) a line input filter for receiving mark and space input signals from an input line and for suppressing any input signals and signal variations having a duration of less than a predetermined minimum time;

(b) said line input filter comprising:

(1) an attenuation network to limit the amplitude of input signals;

(2) a monostable multivibrator; and (3) a plurality of gates connected in circuit with said attenuation network and said multivibrator, whereby input filter has filtered output which follows the input signal with a delay of at least said predetermined minimum time;

(c) a free running oscillator for producing continuously square probe pulses at a predetermined rate;

(d) a frequency divider for producing other square probe pulses at a predetermined reduced frequency from the first named probe pulses, said frequency divider comprising a binary counter including a first series of flip-flop circuits;

(e) oscillator control means including a plurality of gate circuits connected between the oscillator and frequency divider for cutting off from the frequency divider and for restoring to the frequency divider the square probe pulses produced by the oscillator;

(f) a signal regenerator including a single other flip-flop circuit connected to the frequency divider to receive therefrom said other probe pulses and connected to the line input filter for receiving delayed, filtered input signals therefrom;

(g) said signal generator including a single other flip-flop circuit for integrating said filtered input pulses and said other probe pulses to produce timing pulses and for producing output signals duplicating the filtered input signals, said output signals being produced at a rate determined by said timing pulses;

(h) a character code generator including another series of flip-flop circuits connected to the signal regenerator for controlling in a predetermined unit code the number of said other probe pulses passing to the signal regenerator from the oscillator control means; and (i) polarized line driver means connected to the signal regenerator for receiving therefrom said output signals and for applying said output signals with controlled polarity to an output line.

9. A regenerative repeater for telegraph signals, comprising in combination:

(a) a line input filter for receiving mark and space input signals from an input line and for suppressing any input signals and signal variations having a duration of less than a predetermined minimum time;

(b) said line input filter comprising:

(1) an attenuation network to limit the amplitude of input signals;

(2) a monostable multivibrator; and (3) a plurality of gates connected in circuit with said attenuation network and said multivibrator, whereby input filter has filtered output which follows the input signal with a delay of at least said predetermined minimum time;

(c) a free running oscillator for producing continuously square probe pulses at a predetermined rate;

(d) a frequency divider for producing other square probe pulses at a predetermined reduced frequency from the first named probe pulses, said frequency divider comprising a binary counter including a first series of flip-flop circuits;

(e) oscillator control means including a plurality of gate circuits connected between the oscillator and frequency divider for cutting off from the frequency divider and for restoring to the frequency divider the square probe pulses produced by the oscillator;

(f) a signal regenerator including a single other flip-flop circuit connected to the frequency divider to receive therefrom said other probe pulses and connected to the line input filter for receiving delayed, filtered input signals therefrom;

(g) said signal generator including a single other flip-flop circuit for integrating said filtered input pulses and said other probe pulses to produce timing pulses and for producing output signals duplicating the filtered input signals, said output signals being produced at a rate determined by said timing pulses;

(h) a character code generator including another series of flip-flop circuits connected to the signal regenerator for controlling in a predetermined unit code the number of said other probe pulses passing to the signal regenerator from the oscillator control means;

(i) polarized line driver means connected to the signal regenerator for receiving therefrom said output signals and for applying said output signals with controlled polarity to an output line;

(j) a power supply connected to the flip-flop circuits of the character code generator and signal regenerator and to gate circuit of said oscillator control means; and (k) automatic reset means connected to the flip-flop circuits of the character code generator, and signal regenerator and to one gate circuit of the oscillator control means for restoring the flip-flop circuits to a set condition upon restoration of power in the event said power supply is cut off the flip-flop circuits of the character code generator and signal regenerator.

10. A regenerative repeater according to claim 9, wherein said line input filter, oscillator, oscillator control means, frequency divider, signal regenerator, character code generator, and automatic reset all include transistors as active elements thereof.

11. In a regenerative repeater, a line input filter comprising first and second inverters, first, second and third gate circuits, and a multivibrator including control circuitry therefor connected in circuit with said inverters and gate circuits, whereby a polarized line signal transition of either polarity directed to said first gate circuit passes through the first gate circuit and the first inverter to the second gate circuit causing the output of one of the gates to change state, the outputs of the first and second gates being individually directed to the input of the third gate, whereby a change in the output of one gate of the first and second gates will cause a change in state in the output of the third gate and result in a pulsing of the multivibrator, and whereby said control circuitry will cause a change in the multivibrator output if the line signal transition persists for a predetermined time duration; the output of said multivibrator being fed back directly to the input of the first gate and being directed through the second inverter and fed back to the input of the second gate, thereby returning the third gate and either one of the first and second gates to their initial conditions.

12. In a regenerative repeater, a line input filter according to claim 11, wherein the outputs from the multivibrator and said second inverter are fed back to the inputs of the first and second gate circuits respectively, whereby the third gate circuit and either one of the first and second gate circuits are restored to their initial conditions, thus rendering the control circuitry of the multivibrator incapable of retiming itself and causing the multivibrator to rechange state.

13. In a regenerative repeater, a line input filter according to claim 12, wherein the control circuitry of the multivibrator includes a resistance-capacitance input having a predetermined time constant, said resistance and capacitance having values determined by the minimum permissible time duration of a received signal pulse, whereby both mark and space signals are receivable and whereby identical timing is provided to input signals of both positive and negative polarities while additional biasing of the received signals is prevented.

14. In a regenerative repeater, signal regeneration means for regenerating signals, and a line input filter connected to said signal regeneration means, said line input filter receiving input signals of both positive and negative polarity, comprising: reading means having alternately operated and non-operated conditions, a multivibrator for filtering said input signals, multivibrator control circuitry having a common time-length element for timing input signals of both polarities, and feedback circuitry connected from the output of the multivibrator to the reading means, whereby the occurrence of a line signal transition of either polarity will operate the reading means thereby providing a trigger pulse to the control circuitry of the multivibrator, and whereby said common time-length element will allow said control circuitry to cause said multivibrator to reverse its state in the event said line signal transition persists for a minimum predetermined time interval, the reversal of state of said said multivibrator causing a pulse to be fed back to the said reading means to return the same to non-operated condition, and further causing a pulse to be fed to said signal regeneration means for regeneration.

No references cited.

NEIL C. READ, *Primary Examiner.*

T. A. ROBINSON, *Assistant Examiner.*